United States Patent
Wong et al.

(10) Patent No.: US 10,306,279 B2
(45) Date of Patent: May 28, 2019

(54) SYSTEM AND METHOD PROVIDING A FREQUENTLY-ACCESSED SERVICE OR ASSET LIST ON A SECOND DISPLAY

(75) Inventors: Ling Jun Wong, Champaign, IL (US); Charles McCoy, Coronado, CA (US); True Xiong, San Diego, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 13/217,931

(22) Filed: Aug. 25, 2011

(65) Prior Publication Data

US 2012/0210345 A1 Aug. 16, 2012

Related U.S. Application Data

(60) Provisional application No. 61/441,954, filed on Feb. 11, 2011.

(51) Int. Cl.
| | |
|---|---|
| *H04N 21/25* | (2011.01) |
| *H04N 21/254* | (2011.01) |
| *H04N 21/41* | (2011.01) |
| *H04N 21/4722* | (2011.01) |
| *H04N 21/478* | (2011.01) |
| *H04N 21/61* | (2011.01) |

(52) U.S. Cl.
CPC ......... *H04N 21/254* (2013.01); *H04N 21/252* (2013.01); *H04N 21/4126* (2013.01); *H04N 21/478* (2013.01); *H04N 21/4722* (2013.01); *H04N 21/6125* (2013.01); *H04N 21/6175* (2013.01)

(58) Field of Classification Search
USPC ....................................................... 725/9, 16
See application file for complete search history.

(56) References Cited

U.S. PATENT DOCUMENTS

| | | | |
|---|---|---|---|
| 6,075,526 A * | 6/2000 | Rothmuller | H04N 5/445 348/E5.099 |
| 6,509,908 B1 | 1/2003 | Croy et al. | |
| 2003/0018972 A1 * | 1/2003 | Arora | H04H 60/65 725/47 |

(Continued)

FOREIGN PATENT DOCUMENTS

CN 1989768 6/2007

*Primary Examiner* — Michael H Hong
(74) *Attorney, Agent, or Firm* — Stuart H. Mayer; Mayer & Williams, P.C.

(57) ABSTRACT

Apparatus and methods are provided to implement a technique for using a second display with a content playback device. In one implementation, this feature provides users a frequently-accessed service or asset list when browsing on a second display. Such systems and methods may be particularly advantageous when a user normally only visits a few services in an entire list of available services on a regular basis. The frequently-accessed list of services or assets may be populated by the user through the second display or may be populated by the server that is tracking service access by the user. The frequently-accessed service or asset list (or both) may be specific to the user account, a user profile within the user account, the second display, or the content playback device. In some implementations, the second display may be a smart phone that can often be found beside the user, a laptop or tablet PC, or the like.

20 Claims, 8 Drawing Sheets

(56) References Cited

U.S. PATENT DOCUMENTS

| | | | |
|---|---|---|---|
| 2003/0093518 A1* | 5/2003 | Hiraga | H04L 63/104 709/224 |
| 2003/0103088 A1 | 6/2003 | Dresti et al. | |
| 2005/0246325 A1* | 11/2005 | Pettinati | G06F 3/0237 |
| 2007/0011616 A1 | 1/2007 | Ording et al. | |
| 2007/0136761 A1* | 6/2007 | Basmajian, II | G06Q 30/02 725/62 |
| 2007/0250864 A1* | 10/2007 | Diaz Perez | G06Q 30/02 725/52 |
| 2008/0155613 A1 | 6/2008 | Benya et al. | |
| 2008/0168568 A1* | 7/2008 | Brodersen | G06F 21/10 726/30 |
| 2008/0276277 A1* | 11/2008 | Ahn et al. | 725/40 |
| 2009/0037419 A1* | 2/2009 | Huber | G06F 21/36 |
| 2009/0210908 A1* | 8/2009 | Sammarco | H04H 60/72 725/48 |
| 2009/0233593 A1* | 9/2009 | Ergen et al. | 455/420 |
| 2009/0288118 A1 | 11/2009 | Chang | |
| 2010/0269144 A1* | 10/2010 | Forsman | H04N 7/17336 725/92 |
| 2010/0274696 A1* | 10/2010 | Krietzman | G06Q 30/04 705/34 |
| 2010/0293598 A1* | 11/2010 | Collart | G06F 17/30056 726/3 |
| 2012/0117590 A1* | 5/2012 | Agnihotri | H04N 21/25816 725/30 |
| 2012/0151509 A1* | 6/2012 | McCarthy | H04H 20/38 725/9 |

* cited by examiner

SYSTEM AND METHOD PROVIDING A FREQUENTLY-ACCESSED SERVICE OR ASSET LIST ON A SECOND DISPLAY

CROSS-REFERENCE TO RELATED APPLICATIONS

This application claims benefit of priority of U.S. Provisional Patent Application Ser. No. 61/441,954, filed Feb. 11, 2011, entitled "FREQUENTLY-ACCESSED LIST OF SERVICES ON SECOND DISPLAY", owned by the assignee of the present application and herein incorporated by reference in its entirety.

BACKGROUND

Internet delivery of digital content to IPTVs continues to increase, as does the popularity of IPTVs themselves. Digital content delivery is generally performed from content service providers. When a user browses such content service providers, the user normally only has a few services which they will regularly use. However, to access such services, the user is generally required to navigate through a potentially-long list of services to find the desired one. For often-accessed services, this often becomes inconvenient.

SUMMARY

Systems and methods are provided that allow a user to easily navigate to often accessed services, even if the total list of services is long. The service, or list of frequently-accessed services, may be populated by the user or may be populated by a server or device that tracks service access by the user. Besides services, the list may include frequently accessed assets or a combination of frequently accessed services and assets. In the below description, a list of frequently accessed services will be described; however, it will be understood that the same may apply to assets and lists including both services and assets.

In certain implementations, the following sets of steps may be performed, either alone or in combination. In one implementation, a user loads a second display application, such as a web application, and instantiates a utility such as "MANAGE YOUR FREQUENTLY-ACCESSED SERVICES LIST". The user may then search and manually add a service to the list. In another implementation, the user loads the second display application, brings up a service list, and selects a service. In the options for that service, the user takes advantage of an option to add the service to their frequently-accessed service list. In yet another implementation, the user loads the second display application, brings up the service list, and selects a service. The server processes the request and returns the response of service access. At the same time, a counter for that service is incremented, e.g., as stored on the second display or on the server. The next time the second display web application loads, the frequently-accessed service list will be populated with the most frequently-accessed service at the top. If the service was not initially in the list, the service may be added. Likewise, if the service has not been accessed for some time, it may expire or automatically drop out of the list.

For cases where the user knows services will not be accessed for an extended period of time, e.g., six months, the user may put the counter on hold, so that the services will not expire. When the hold is expired, the normal expiration window will kick in.

Implementations of the invention may include other or extended features. For example, besides keeping track of which services are frequently watched, the time and duration of the playback of services may also be monitored and analyzed. For example, if a user watches a particular set of news shows in the morning, and watches more movies or comedy or drama shows in the evening, services providing news shows may be more preferentially displayed in the morning, while services displaying movies or comedy or drama shows may be more preferentially displayed in the evening. For example, the display may be tied to particular time zones. In other implementations, time and duration information may be used as a weighting on the information about the number of times services are accessed.

Implementations may take into account different devices on which such services are accessed. For example, an audio service accessed in the car may have more preferential notice and display when the car device is again accessed on a second display.

In more advanced embodiments, the system may take account of the extent to which it can objectively determine active viewing versus passive viewing by a viewer. For example, if a viewer is actively changing the volume over the course of content viewing, it may be inferred that the user is actively viewing the content.

In other implementations, the list of displayed favorites may be dependent on a profile that has been logged onto. For example, different members of a family may have different profiles, and each may have a different set of frequently-accessed services. In this case, the system would generally have to have received information about which services were accessed by which user profiles. Such may be obtained if a user has logged onto their profile prior to accessing a service. In other systems, such information may be obtained by inferring which user has accessed which service(s), such as by keystroke analysis. The system and method are not limited to second displays—IPTVs can directly implement such systems and methods as well. Moreover, the list may be specific to a device or may be common across all devices registered under the user.

The displayed list may be filtered based on the capability of a selected device to play back content from the displayed services, if a device has been so selected. In some cases, where a device is capable of playing back a content item from a service listed but cannot do so for business reasons, i.e., a lack of affiliation with the service, the user may be prompted to create such an affiliation. Other such situations include where a country or region has enacted various content restrictions or where a user has not opted in to a service. Alternatively, instead of filtering, the complete list including inaccessible services may be displayed, but with a notation that such services are currently unavailable.

In some implementations, a user may configure the system and method to display not only a list of frequently-accessed services but also a set of frequently-viewed categories within the services. To enable these possibilities, the user may provide their choices in an option list or the same may be automatically performed by the system and method using other details of the user profile.

Systems and methods are provided that allow a user to easily return to a frequently-accessed service when browsing on a second display. The most recent service accessed may appear by itself or at the top of a list of frequently-accessed services. This feature provides a better user experience, and is a useful feature at least in part because a user normally only visits a few services in the entire list of available services on a regular basis.

The second display provides complementary functionality to the IPTV, and generally does not require additional investment by the user because the same make use of a device, e.g., a smartphone, laptop computer, tablet computer, an internet appliance, etc., which most users would already have in their possession. Such a second display provides a complementary functionality to a content playback device such as an IPTV because of the second display's strength in supported languages and character font sets, data entry, processing power, and user experience in content management.

Where the second display application is a web application, the same may be scripting or non-scripting. The second display application may also be a Java application or any other sort of application that may communicate with a server. For example, the ASP/.NET framework with RPC can be employed to write the second display application. Where the web application running on the second display is written in HTML or HTML with Javascript, the same may be loaded by any device with a browser, and so the same is not limited to only a small set of compatible devices or expensive remote controls. Where a smartphone is employed, a mobile version of the second display user interface may be employed, with an appropriate listing of fields and an appropriate mobile resolution.

Communications with service providers may take place through a proxy server, and the proxy server presents to service providers the authentication credentials of the content playback device, so that the second displays appear to the service providers as authenticated content playback devices.

As noted above, the second displays may include any device that can run an application that communicates with a content playback device, including, but not limited to, personal computers, laptop computers, notebook computers, netbook computers, handheld computers, personal digital assistants, mobile phones, smart phones, tablet computers, hand-held gaming devices, gaming consoles, Internet appliances, and also on devices specifically designed for these purposes, in which case the special device would include at least a processor and sufficient resources and networking capability to run the second display application.

The content playback device can take many forms, and multiple content playback devices can be coupled to and selected within a given local network. Exemplary content playback devices may include IPTVs, DTVs, digital audio systems, or more traditional video and audio systems that have been appropriately configured for connectivity. In video systems, the content playback device includes a processor controlling a video display to render content thereon.

In a general method, a user employing a second display has a user account with a source or clearinghouse of services. Here, the source or clearinghouse is represented as a user account on a management server, but it should be understood that the user account may be with a service provider directly. The user account may have information stored thereon related to what content playback devices are associated with the user account. When a user logs on, they may see this list of content playback devices and may choose a particular content playback device. If there is only one content playback device on the network, or if the user is browsing in a way that the content playback device identity is not needed, then this step may be omitted. Moreover, a user may control content playback devices that are not included in a user account. For example, content playback devices may be discoverable and controllable, e.g., via infrared or Bluetooth® or otherwise, that are not part of the user account with a management server or with a service provider. It may even be possible for a user to play back content on such a content playback device, if a service provider has made available content that can be delivered without access made to a user account.

Once a content playback device has been chosen, a list of services may be displayed. The list of services may be customized to those that have content playable on the chosen content playback device, or all available content may be displayed, in which case, e.g., a notation may be displayed adjacent the asset as to whether it is playable on the selected device. In certain systems, methods, and implementations described here, a list of services (or assets, or both) may be displayed based on which services (or assets, or both) have been frequently-accessed by the user.

Where no content playback device has been selected, all available content may be displayed. If no content playback device has been selected, but the user account includes stored information about which content playback devices are available, then all content may be displayed, a subset of all content may be displayed based on the known content playback devices associated with the account, or notations may be presented about which content playback devices can play which content, or a combination of these. In some cases, a content service provider may require a content playback device to be chosen so as to determine if content from that service provider may be played back. In other cases, no content playback device need be chosen and the user may simply choose and queue content for later playback by a content playback device to-be-determined at a later time.

Assuming multiple services are available, the user then selects a service to browse. In many cases, access to a service requires becoming affiliated with the service. Details of such affiliation processes are provided in U.S. patent application Ser. No. 12/982,463, filed Dec. 30, 2010, entitled "Device Registration Process from Second Display", owned by the assignee of the present application and incorporated by reference herein. Once the content playback device is affiliated with services, the user may choose which service they wish to browse. Where a content playback device has not been chosen, the user may still choose services and browse, but the content offerings may be less specific to a given content playback device. The service presents a list of available assets. The presentation may be in any number of forms, including by category, by keyword, or in any other form of organization. The proxy server presents an authentication credential of the content playback device to the content server. In some cases, credentials for accessing the various services may be stored in the user account, and presented by the proxy server or management server to the content server when needed.

Individual services may employ their own DRM schemes which the current systems and methods may then incorporate. For example, if a video content service provider only allows a predetermined number of devices on which their content may be played back, then this rule may be enforced or duplicated within the context of the current system and method. Moreover, changes to such service provider rules or other parameters may be periodically polled for by the proxy server and/or management server, or the same may be polled for at a subsequent login of the service, e.g., at the time the affiliation is renewed. In other words, upon login, the system and method may poll for and receive a token associated with the given service provider, the token providing information to the system about the service provider as well as about the user account with the service provider.

The system and method may include a management server as mentioned above which, along with the content playback device, communicates with at least one content server such that the content server provides assets for presentation at the content playback device. The system and method may further include a proxy server communicating with the management server and the second displays. In some cases, the proxy server may be merged with the management server, or in other cases a separate proxy server may be provided for each content server or service provider.

In one aspect, the invention is directed towards a method of creating a list of frequently-accessed services or assets or both, including: in a management server infrastructure where a second display associated with a user account allows access to a plurality of services and assets for playback of assets by a content playback device, at least a portion of the services and assets having counters associated therewith for enumerating a number of accesses, upon access of a service or asset on the second display, causing a counter associated with the service or asset, respectively, to be incremented; and displaying a list of frequently-accessed services or assets or both on the second display, the list including services or assets or both having a highest number of accesses according to the respective counters.

Implementations of the invention may include one or more of the following. The counters may be maintained on the second display or on a server. The displaying may be caused by a user request on the second display. The list of frequently-accessed services or assets on the second display may further include services or assets, respectively, that have been manually entered. The same may also be entered by action of a service, where a user has directed from within a service that the service or asset, respectively, be included in the list of frequently-accessed services or assets. The method may further include removing a service or asset from the list of frequently-accessed services or assets, respectively, if the respective service or asset has not been accessed for a time period greater than the duration of an expiration window. The method may further include stopping operation of the expiration window or the counters upon direction by a user. The method may further include storing data about a second display, content playback device, user account, or user profile associated with the service or asset access, and the frequently-accessed service or asset list may be specific to the second display, content playback device, user account, or user profile, respectively. The list of frequently-accessed services or assets may be specific to a time-of-day recorded by the second display, content playback device, user account, or user profile. The method may further include filtering the list of frequently-accessed services or assets based on a regional ruleset corresponding to a region in which the content playback device resides. The second display may be a tablet computer, a smart phone, a laptop computer, an internet appliance, or a computing device with internet access. The method may further include ordering the list on the second display according to the number of accesses according to the respective counters.

In another aspect, the invention is directed towards a non-transitory computer-readable medium, comprising instructions for causing a computing device to implement the above method.

In another aspect, the invention is directed towards a method of enabling a user to access a frequently-accessed service or asset on a second display, including: in a management server infrastructure where a second display associated with a user account allows access to a plurality of services or assets for playback of assets by a content playback device, at least a portion of the services or assets, respectively, having a counter associated therewith for enumerating a number of accesses, upon access of a service or asset on one second display, receiving a signal about the accessed service or asset, respectively, at a management server; and causing the display on the one or another second display of a list of the most frequently-accessed services or assets or both, the list including services or assets or both, respectively, associated with the user account having a highest number of accesses according to the respective counters.

Implementations of the invention may include one or more of the following areas the list of frequently-accessed services or assets caused to be displayed on the second display may include services or assets that have been manually entered. The list of frequently-accessed services or assets caused to be displayed on the second display may include services or assets that have been entered by action of a service, where a user has directed from within a service that the service or asset be included in the list of frequently-accessed services or assets. The method may further include storing data about a second display, content playback device, user account, or user profile associated with the service or asset access, and the frequently-accessed service or asset list may be specific to the second display, content playback device, user account, or user profile, respectively. The method may further include filtering the frequently-accessed service or asset list based on a regional ruleset corresponding to a region in which a content playback device associated with the user account resides.

In another aspect, the invention is directed towards a non-transitory computer-readable medium, comprising instructions for causing a computing device to implement the above method.

Advantages of certain embodiments of the invention may include one or more of the following. Systems and methods according to the principles described here provide a global solution for content management, and in particular allow a set of services to be queued in a frequently-accessed service list, allowing convenient access to such services. The systems and methods allow a user to more quickly access commonly-used services, even on a new content playback device, because the same will have access to the user account immediately upon registration with a management server infrastructure.

Other advantages will be apparent from the description that follows, including the figures and claims.

BRIEF DESCRIPTION OF THE DRAWINGS

Like reference numerals denote like elements throughout.

DETAILED DESCRIPTION

Figure 1:
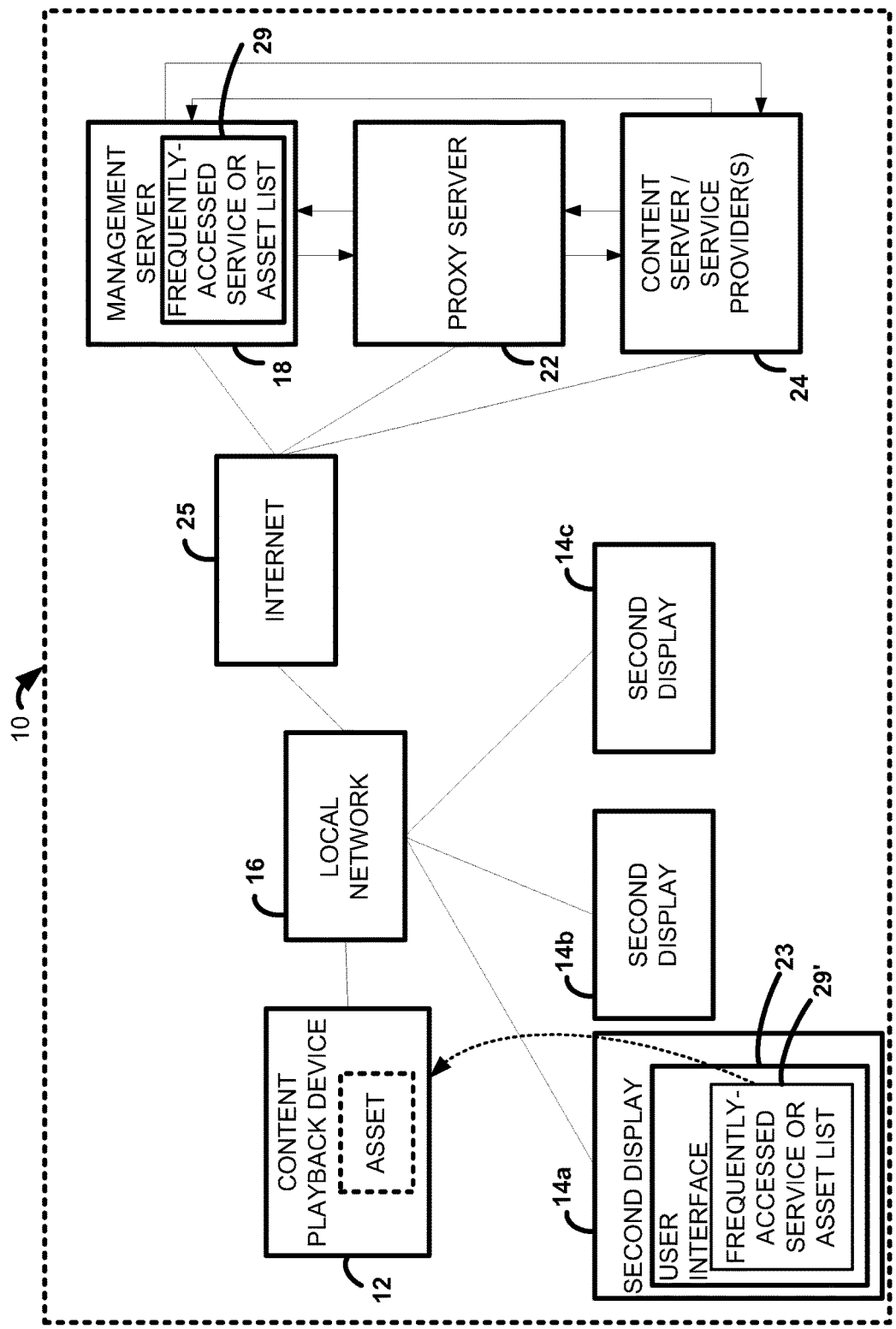
FIG. 1 is a block diagram of an exemplary system in accordance with one aspect of the present principles.

Referring initially to FIG. 1, a system 10 is shown including a content playback device 12 coupled to a local network 16, which may be wired, wireless, or a combination of both. Also coupled to the local network 16 are one or more second displays 14a-14c, an exemplary one of which is termed herein second display 14i. A number of servers may be accessed by the content playback device 12 and the second display 14i through the local network 16 and the internet 25, including a management server 18, a proxy server 22, and one or more content servers 24 corresponding to service providers (only one is shown in FIG. 1).

The second display 14a includes a user interface 23 for a second display application which when launched may in turn control in a number of aspects of service selection and content playback. In one aspect, according to the principles described here, the user interface may display a frequently-accessed service list 29', the list including services that have been frequently-accessed by the user, and which corresponds to a frequently-accessed service list 29 of services which may be stored on the management server 18. Different ways in which the frequently-accessed service list may be generated, stored, updated, maintained, and used are described below. Such a list may also include frequently accessed content items or assets, or may include a combination of assets and services. Alternatively, a separate list may be maintained for frequently accessed content items or assets. In any case, however, in the below description, frequently accessed services will be described, at the methods and principles disclosed are clearly not limited to the same.

Using this system 10 of FIG. 1, a user of the second display 14a is provided with a convenient way to access a service. In this way, the user is saved the inconvenience of having to navigate through a long list of services, find the service, and arrange for access of the same. Moreover, the convenient and flexible user interface 23 of the second display 14a may then be leveraged to choose and navigate through the service to select content for playback on the content playback device 12.

Details of individual components are now described.

The content playback device 12 may be, e.g., an IPTV, a digital TV, a digital sound system, a digital entertainment system, a digital video recorder, a video disc player, a combination of these, or any number of other electronic devices addressable by a second display or other control on the local network 16. For the sake of simplicity, in this specification, the content playback device 12 will generally be exemplified by an IPTV, in which case the same will typically include a processor that controls a visual display and an audio renderer such as a sound processor and one or more speakers. The processor may access one or more computer-readable storage media such as but not limited to RAM-based storage, e.g., a chip implementing dynamic random access memory (DRAM), flash memory, cloud-based storage, or disk-based storage. Software code implementing present logic executable by the content playback device 12 may also be stored on one or more of the memories disclosed below to undertake present principles. The processor can receive user input signals from various input devices including a remote control device, a point-and-click device such as a mouse, a keypad, etc. A TV tuner may be provided in some implementations, particularly when the content playback device 12 is embodied by an IPTV, to receive TV signals from a source such as a set-top box, satellite receiver, cable head end, terrestrial TV signal antenna, etc. Signals from the tuner are then sent to the processor for presentation on the display and sound system. A network interface such as a wired or wireless modem communicates with the processor to provide connectivity to the Internet through the local network 16. It will be understood that communications between the content playback device 12 and the internet 25, or between the second display 14i and the internet, may also take place through means besides the local network 16. For example, the second display 14i may communicate with the content playback device 12 through a separate mobile network.

The one or more second displays 14a-14c each bear a processor and components necessary to operate an application for, e.g., service provider and content selection, as well as for display of a frequently-accessed list of services or assets or both. As noted above, in this description, a frequently accessed list of services will be described; but it will be understood same may apply to assets or to a list combining services and assets.

In particular, the processor in the second display may access one or more computer-readable storage media such as but not limited to RAM-based storage, e.g., a chip implementing dynamic random access memory (DRAM), flash memory, or disk-based storage. Software code implementing present logic executable by the second display may also be stored on one of the memories disclosed below to undertake present principles. Further, the second display 14i can receive user input signals from various input devices including a point-and-click device such as a mouse, a keypad, a touchscreen, a remote control, etc. The second display 14i may also receive user commands via the internet, such as via a remote control. For example, in some cases, remote data entry may be performed, or a command may be triggered, on a second display from a remote location via the internet. A network interface such as a wired or wireless modem communicates with the processor to provide connectivity to the local network and to wide area networks such as the Internet as noted above.

The servers 18, 22, and 24 have respective processors accessing respective non-transitory computer-readable storage media which may be, without limitation, disk-based and/or solid state storage. The servers communicate with a wide area network such as the Internet via respective network interfaces. The proxy server 22 may in some cases be combined with the management server 18, although in many cases it may be preferable to separate the servers to better accommodate server load. The servers may mutually communicate via the internet 25. In some implementations, the servers may be located on the same local network, in which case they may communicate with each other through the local network without accessing the internet. For example, in one exemplary implementation, the management server 18 and the proxy server 22 may be disposed in the same data center, so communication between the two may stay within the data center.

While an exemplary method of the system is described below, certain method steps especially pertinent to certain arrangements of the second display will be described here.

Responsive to the second display 14i sending a request to the proxy server 22 for an executable utility, the proxy server 22 returns the utility to each second display 14i. Running the utility causes the initialization of an application. The implementation discussed here includes a web application, but it will be understood that other types of applications may also be employed.

The second display 14i, executing the web application, prompts a user to input to each second display 14i login information. The login information may be common or may differ between second displays. The proxy server 22, responsive to reception of correct login information from the content playback device 12, returns the local IP address of the content playback device 12 to the second display 14i, because the same has previously been registered to a user account in which such information is maintained. The proxy server 22 may also return an external IP address. In this way, communications may be allowed from outside the local network, e.g., by a second display to a content playback device.

The proxy server 22 may also return a list of content playback devices on the local network, responsive to which the second display 14i may select one for content playback. In turn, each second display 14i uses the local content playback device address to access the content playback device 12 directly to request information about the content playback device 12, which information is returned from the content playback device 12 to the second display 14i such that the local address of the content playback device 12 need not be globally addressable. Each second display 14i may also select content for playback on different content playback devices. The second display 14i sends the information about the content playback device 12 to the proxy server 22, requesting a list of services available to the content playback device 12 from one or more service providers. The services may be dependent on the device characteristics of the content playback device 12 chosen. For example, if the chosen content playback device 12 is an IPTV, video services may be returned. If the chosen content playback device 12 is an audio system, audio services may be returned.

The proxy server 22 relays the request for a list of services to the management server 18, which returns the list to the proxy server 22, with the proxy server 22 in turn sending the list to the second display 14i for presentation of information on the second display 14i. Where the request is for a list of frequently-accessed services, either via a specific request by a user or an automatic request by the system, the frequently-accessed service list is generated, e.g., in the manner described below, and returned. A user selects a service, and the proxy server 22 requests a service login of the content server 24 associated with the service, and the content server 24 provides to the proxy server 22 a list of assets, categories, or services, and the proxy server 22 relays the list to the second display 14i, which is presented on the second display 14i so that the user can navigate to enter a selection. Responsive to the selection, the second display 14i sends a command to the content playback device 12 to access and play back the selection.

The command to play the local asset may be in a number of forms. The second display 14i may communicate to the proxy server 22 the request on behalf of the content playback device 12, and this request may be via the local network or via other means. Alternatively, the second display 14i may transmit a request to the content playback device 12 that it itself formulate the request, and this transmission may be by way of the local network, the internet generally, or via other means such as other wired or wireless transmission schemes, including via USB, IR, Bluetooth®, or any other schemes. If the second display 14i is configured to address the content playback device 12 at a non-local level, e.g., at the server level, then the second display 14i may be physically located virtually anywhere and still be able to queue content or to command the content playback device 12 to play content. In this case, however, server load would increase over the case where the second display and content playback device communicated directly or over a local network.

Certain method steps of an arrangement of the content playback device are described here. Using a network interface, the content playback device 12 can communicate with a management server 18 on the Internet and with one or more content servers 24, also on the internet and communicating with the management server 18. The management server 18 receives and stores a local IP address of the content playback device 12. The content playback device 12 communicates with the management server 18 to arrange for assets from the content server 24, operated by a service provider, to be played back on the content playback device 12. In one embodiment, the content playback device 12 sends login information to the management server 18 which returns to the content playback device 12 a user token that must subsequently be presented by the content playback device 12 to the content server 24 to obtain content from the content server 24.

Figure 2:
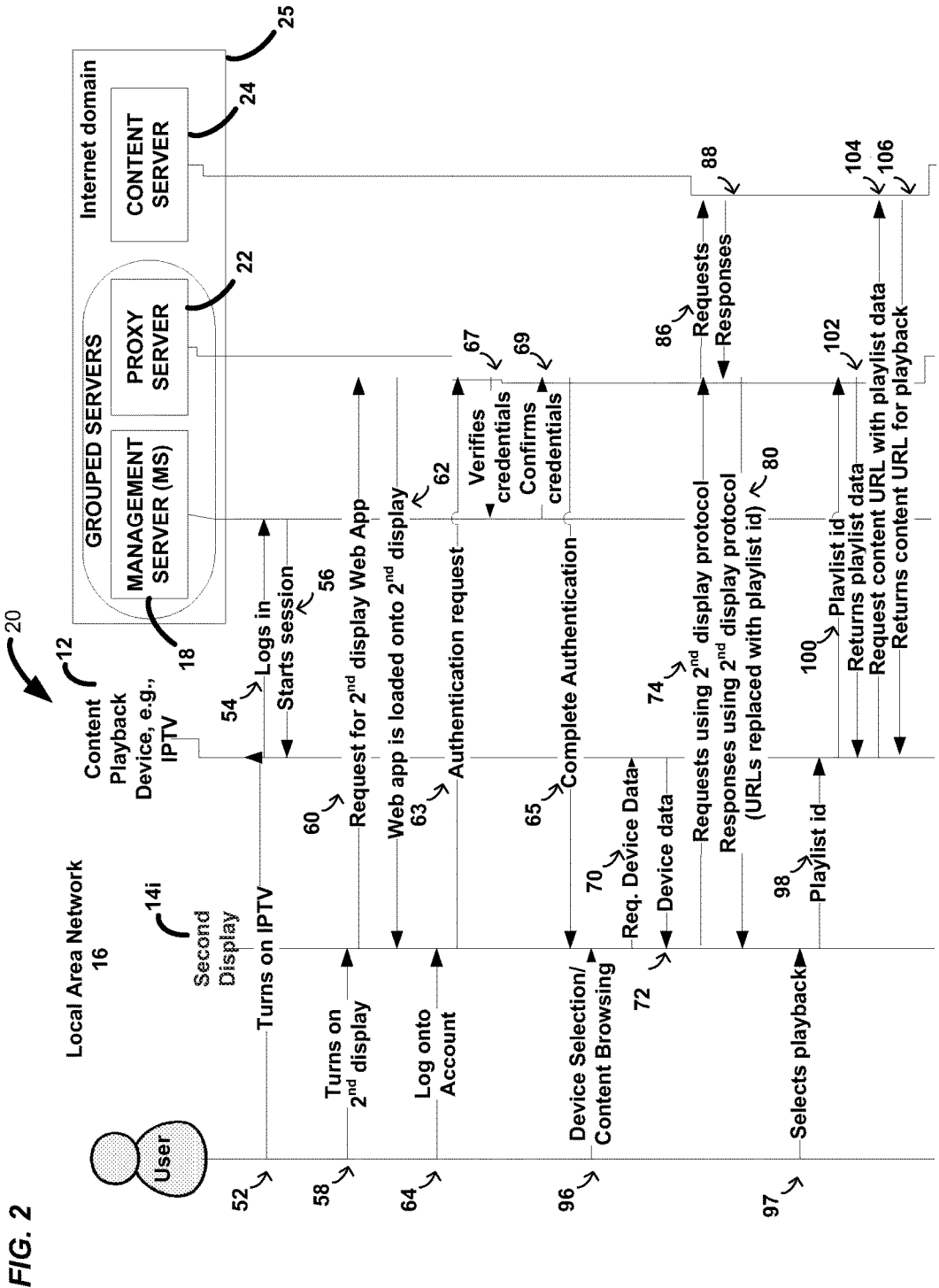
FIG. 2 is a sequence diagram illustrating a system and method according to another aspect of the present principles.

FIG. 2 is a sequence diagram illustrating an exemplary implementation of a method for enabling a user to employ a second display to browse content playback devices, service providers, and assets, and select the same for playback by a content playback device. FIG. 2 assumes that the user has already created an account with a management server and has affiliated or registered one or more content playback devices with that account.

At state 52, a user turns on the content playback device 12. At state 54 the content playback device sends login information including, e.g., username and password, to the management server 18, which at state 56 returns to the content playback device a user token that may subsequently be presented by the content playback device to a content server 24 to obtain content from that server. The management server 18 in addition stores the local IP address of the content playback device 12.

At state 58, the user turns on the second display 14i and instantiates a web browser session in which control may be exercised over the content playback device. Other types of sessions may also be employed as has been noted. A utility is executed on the second display 14i, at state 60, which sends a request to the proxy server 22, which returns in state 62 a web application, e.g., HTML with JavaScript, for the second display to execute for browsing services and assets. This application may make, e.g., asynchronous JavaScript and XML calls to the proxy server 22 and to the content playback device 12 to obtain information to control the content playback device 12.

At state 64, using the JavaScript received from the proxy server 22, the second display 14i prompts the user to input to the second display 14i the account login information, including, e.g., the same username and password that the content playback device provided to the management server 18 in state 54 during device registration. Of course, the account login information may differ as well. The user may be prompted to cache login information as well. It will be appreciated that the servers 18, 22, and 24 communicate necessary account information between them as needed to realize the principles described here.

The proxy server 22 responds to a correct user name and password from the second display 14i in an authentication request state 63. The proxy server 22 verifies the user name and password with the management server 18 (states 67 and 69), creates and transmits a session token to the second display, obtains information about content playback devices affiliated with the user account, and completes the authentication in state 65. The proxy server 22 may return to each second display the information about all content playback devices 12 that are affiliated or registered with the user account associated with the user name and password, including their local IP addresses which were stored by the management server 18 after login at 54 (and subsequently provided to the proxy server 22). The proxy server 22 sends a token to the second display 14*i*, the token associated with a content playback device, and this token is communicated in future transactions between the second display and the proxy server, so that the proxy server 22 knows what content playback device the asset is intended for. Each user with each second display may then choose a content playback device and browse the services (including a list of frequently-accessed services if requested) and content options available through the services in state 96 and subsequent steps.

The second display 14*i*, using the local IP address returned as noted above, accesses the content playback device directly, in the sense of communicating through the local network. To select a particular content playback device, the second display 14*i* requests information about the content playback device 12 at state 70, including language information, digital rights management (DRM) information, etc., as desired, which information is returned from the content playback device to the second display 14*i* at state 72. Since the second display 14*i* knows the IP address of the content playback device 12 and consequently communicates directly with the content playback device 12, the second display 14*i* communicates using a local web address of the content playback device 12 that need not be globally addressable, and may so communicate as long as the second display 14*i* and content playback device 12 are on the same local network.

Each second display 14*i* may send the client information received at state 72 to the proxy server 22, requesting a list of services (including in some cases a list of frequently-accessed services) available to the content playback device 12, or that the content playback device 12 is entitled to, from one or more of the content servers 24. The proxy server 22 relays the request to the management server 18, which returns the requested service list to the proxy server 22. The proxy server 22 in turn sends the services list to the second display for presentation of available services on the second display. The user browses the services and their content on the second display just as though it were the actual content playback device.

A user can input, using, e.g., a second display input device, a selection of a service or asset on the list, e.g., the frequently-accessed service and/or asset list, that was returned to the second display. In response, the second display, at state 74, sends a request for the corresponding service to the proxy server 22 along with the service token that that second display may have received from the content server 24 via the management server 18.

Responsive to the request, the proxy server 22 requests a service login at state 86 of the content server 24 providing the selected service. At state 88, the content server 24 provides to the proxy server 22 a list of assets, categories or services, as the case may be, for the particular content server 24. If desired, the proxy server 22 may also request of the content server 24 a list of options, and the list may be returned in, e.g., extended markup language (XML) format to the proxy server 22 which relays the assets, categories, services, etc. available for selection to the second display at the state 80.

The content available for selection is presented on the second display so that the user can navigate (in state 97) the display to enter a selection. Responsive to the selection, the second display at state 98 sends a command to the content playback device 12 to play the selection, and in particular sends a playlist id or reference identifier indicating the selection. At state 100, the content playback device 12, using its authentication credentials, sends the playlist id or reference identifier to the proxy server 22, which returns the required playlist data in state 102. The content playback device 12 can then request the content URL with the playlist data in state 104, which may be responded to with a return of the content URL for playback of the asset on the content playback device 12 in state 106.

Variations of the system and method are now described.

If the content playback device were already playing content, the new content commanded to be played by the second display may be placed in a queue in the content playback device and played when the current content completes. In any case, once the content has been commanded to be played, the user may continue to browse the second display for other content, to play or add to the queue. Other users on the network may employ their own second displays to do the same.

The above description has been for the case where the proxy server 22 is employed to hide the content source, e.g., a content URL, from the second display 14*i*. That is, the proxy server 22 provides an API for the second display to use so that the content and/or content URL cannot be accessed directly. In this way, the details of the management server transactions to access the services remain desiredly unknown. In many cases, the second display 14*i* may have stored thereon little or no details about the content playback device 12. In some cases, however, the URL may be directly provided from the proxy server 22 or the proxy server 22 may even be bypassed, e.g., in cases where the asset is intended for free distribution, e.g., movie or game trailers or the like. Similarly, while the above description has focused on asset playback on content playback device 12, certain assets, e.g., those which are intended for free distribution, may be played back on the second display 14*i* itself, if the same has been appropriately configured.

In the case where multiple second displays request content to be played at or near the same time, a simple rule such as the first-in-time may prevail. Alternatively, a priority scheme may be configured, such that certain second displays take precedence over other second displays. Alternatively, a plurality of user profiles may be employed, and precedence may be based on the identity of specific users.

The control device may command the content playback device to play content by sending, to the content playback device over the local network, commands coded as if they were sent from an infrared remote control, e.g., the commands may be in the Sony Infrared Remote Control System (SIRCS) protocol.

Figure 3:
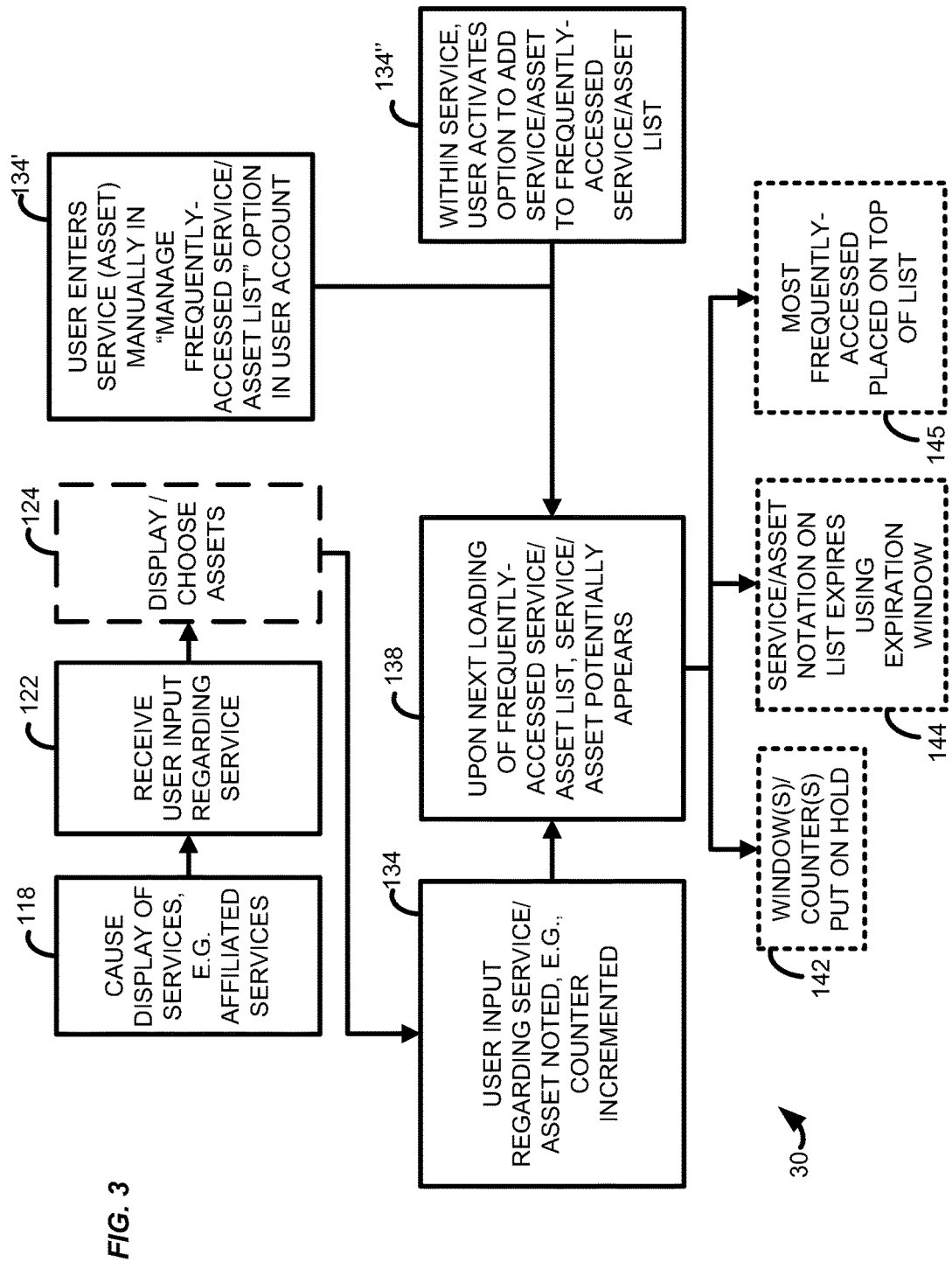
FIG. 3 is a flowchart illustrating an exemplary method according to a further aspect of the present principles, showing steps particularly appropriate to a server.

FIG. 3 is a flowchart 30 of an exemplary method including steps for causing a frequently-accessed service and/or asset list to be populated and steps for using the same. The flow chart 30 may especially pertain to steps performed by a server for accessing a service list, although in certain cases steps may also be performed by the second display or content playback device.

Initially it is noted that, prior to the steps of flowchart 30, steps that may occur preliminarily include an establishment of a user account session between a second display and a server, e.g., via a second display application. The second display application may be a web application, a native application, or any other application by which a second display may communicate with the server. The session is generally associated with a user account, and the user generally enters logon credentials such as a username and password for access. Other variations will also be understood. The server may be a management server, a proxy server, or the like. A next step is to cause the display of a list of one or more content playback devices associated with the user account. The displayed content playback devices may become associated using a registration process when the same are initially added to the network. Other unregistered content playback devices may be displayed, e.g., those discovered by the second display, such as via Bluetooth®, infrared, or other such signal communication techniques. A final preliminary step is to receive user input regarding which content playback device is to be used. It is noted that not all the preliminary steps need be performed in every implementation. For example, a user may browse in some circumstances without a content playback device selected.

FIG. 3 illustrates various ways of populating a frequently-accessed service list. In a first way, a first step is to display one or more services (step 118) as described above. Such services may be affiliated or unaffiliated. Affiliated services are those associated with the user account. Other or unaffiliated services may also be displayed, such as to introduce a user to new services and to encourage affiliation.

A next step is to receive user input regarding which service to browse (step 122). A user input may then be received regarding the service. Once the service is selected and accessed, assets of the service may be displayed (step 124) according to the configuration of the service. A request may be transmitted for an asset to a server, such as a management server, and the server processes the playback request.

On the management server, or in some cases on the second display, user input regarding the accessed service is noted, e.g., by incrementing a counter associated with the service (step 134). In this way, the system can accumulate the data required to determine the frequency of the access of the service by the user. The frequencies of various services may then be compared and, upon the next loading of a frequently-accessed service list, those services that are most frequently-accessed appear (step 138). The determination of which services are most frequently-accessed may be on an overall basis, taking into account a long span of time, or may more generally be on the basis of a shorter span of time, such as services accessed within the last week, within the last month, or the like. The list may be ordered such that the most frequently-accessed service is at the top (step 145), and thus most easily accessible.

Alternative ways of populating a frequently-accessed service list may also be employed. In one variation, a user may enter a service or asset manually (step 134'). That is, a user may access an option such as "MANAGE FREQUENTLY-ACCESSED SERVICE AND/OR ASSET LIST", e.g., within the management server infrastructure, e.g., associated with their user account. Within this option, a sub option may be provided to add a desired service or asset to the list. The added service or asset may be present on the list perpetually, or may expire after a given expiration window of time (step 144) if not accessed. Such aspects, e.g., the duration of the expiration window, may be managed by the user in a PREFERENCES pane within the second display application.

In another variation, from within a service, a user may activate an option to add the service or asset to the frequently-accessed service list (step 134"). In so doing, the service may send a signal to the management server or to the second display, or both, depending on which is stored the list, indicating that the service or asset is to be added.

In a variation, the user may temporarily suspend or hold operation of the expiration window and/or counters (step 142), so that if the user is away from the system for an extended period of time, services or assets in the frequently-accessed list will not be removed. When the hold is expired, the normal expiration window will commence, either at the beginning of the window or at the point at which the operation was suspended.

Figure 4:
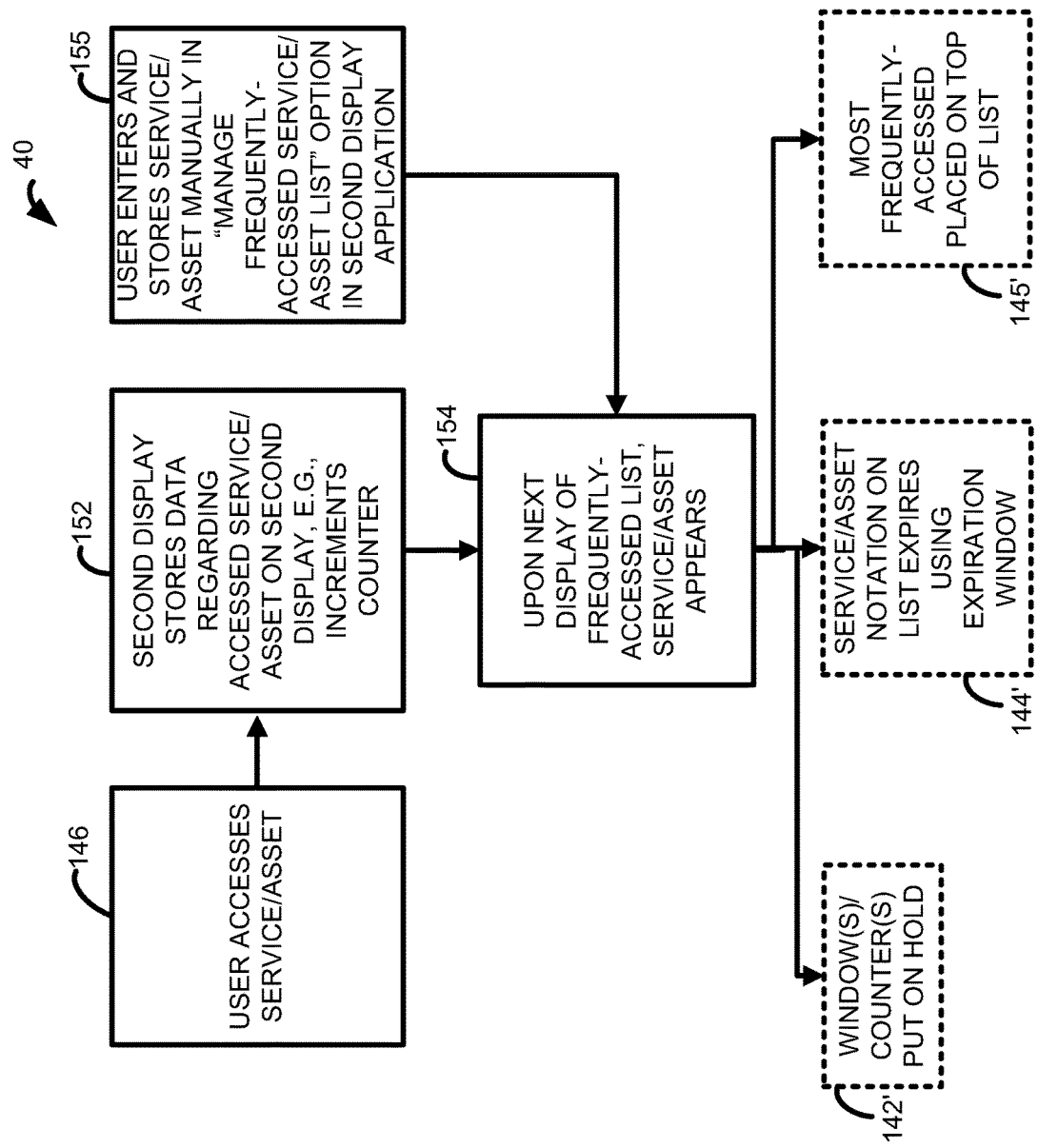
FIG. 4 is a flowchart illustrating an exemplary method according to yet another aspect of the present principles, showing steps particularly appropriate to a second display.

Referring to FIG. 4, steps of a method are illustrated in flowchart 40, particularly as may be performed by a second display 14i. A first step is that the user accesses a service (step 146). Typically a user accesses a service using a second display application on a second display, although services may be accessed on a content playback device as well. A next step is that the second display application stores data regarding the accessed service, e.g., by incrementing an associated counter on the second display (step 152). In general, a counter on either the server or the second display, or both, may be employed in the determination of what services are on the frequently-accessed list. When an asset is accessed, a counter associated with the asset may be incremented.

In yet another way in which services may appear on a frequently-accessed service or asset list, a user may enter and the second display may store a service or asset, e.g., using a service identification in the case of a service, manually in an option in the second display application. For example, an option such as "MANAGE FREQUENTLY-ACCESSED SERVICE OR ASSET LIST" may be employed for this purpose.

A next step is that, upon the next display of a frequently-accessed list, an entry corresponding to the service or asset accessed in step 146 or added in step 155 appears (step 154). This display may be called by a user using a menu, button, or other feature within the second display application, or may be automatically provided by the second display, e.g., as a widget or other readily-accessible list. The user may be prompted to access the most frequently-accessed service or asset (step 145'), or as noted above the list may be displayed from which a user may choose a desired service or asset. As noted above, a service or asset on the list may be provided with an expiration window, and the service or asset may be removed from the list subsequent to the closing of that window (step 144'). In this way, the list is maintained by a periodic cleaning procedure. In a similar way as on the server, the second display application may also provide for holding or temporarily stopping the operation of the expiration windows and counters (step 142') in the case where a user is away from the system for an extended period of time.

Figure 5:
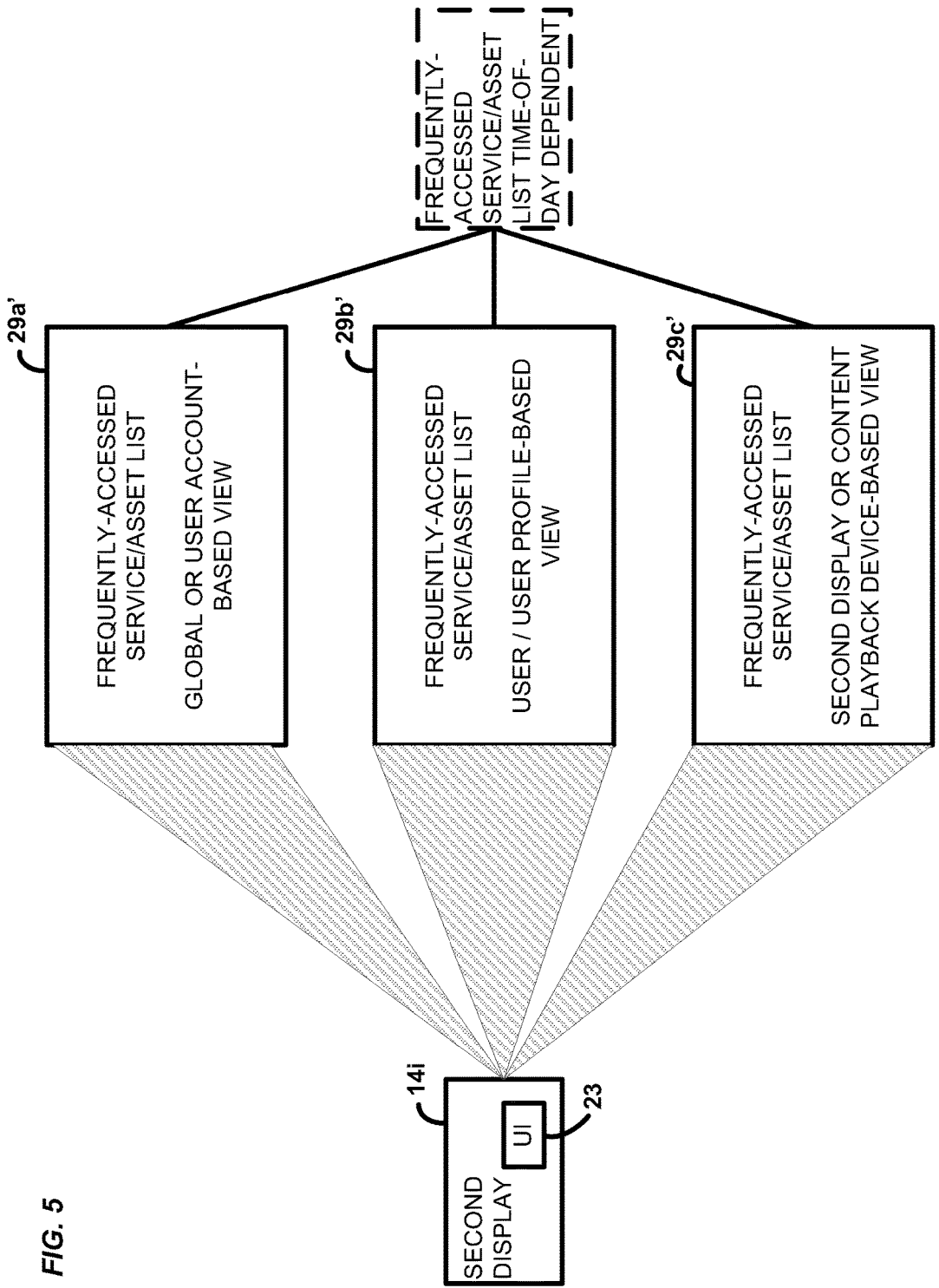
FIG. 5 is a diagram illustrating various types of frequently-accessed service lists that may be presented on a user interface of a second display in accordance with another aspect of the present principles.

FIG. 5 schematically illustrates how different types of frequently-accessed service or asset lists may be portrayed on a user interface 23 of the second display 14i. Different lists may be generated because the scope of services or assets taken into account in generating the lists may differ.

For example, a frequently-accessed service or asset list 29a' provides a global or user account-based view. In this view, the frequently-accessed services or assets from all second displays or content playback devices on the user account, or accessible to the user account, are considered. In other words, no matter which was used for selection or access, a list of the most frequently-accessed services and assets will appear.

By contrast, a frequently-accessed service or asset list 29b' provides a user profile-based view. In this view, a number of user profiles are associated with the user account. For example, each family member may have their own user profile. The frequently-accessed service or asset list may then be based on the user profile, so the frequently-accessed services and assets will be specific to the user. Upon logging onto the user profile, the displayed frequently-accessed service or asset list will include the most frequently-accessed services and assets directed to be accessed from that user profile, but will not include services or assets directed to be accessed from other user profiles associated with the user account. Such a list may be convenient to allow a user to just focus on their own services and assets of interest.

It is noted in this connection that the various lists as described may be combined, or multiple types of lists may be presented as alternatives for viewing by the user. In this way, a family member may view their own services or assets of interest or may view what the rest of the family has watched. Moreover, certain user profiles may include special administrator privileges, so as to allow inspection of services and assets accessed by other user profiles.

Another type of frequently-accessed service or asset list is that portrayed by list 29c', which is a content playback device-based view, where the displayed services and assets are those which are the source of content items recently played back by a given content playback device. This type of list may be appropriate, e.g., for service or asset access where the particular content playback device is the only one capable of playing the service or asset. In a related implementation, a frequently-accessed service or asset list may be based not on a particular content playback device but on a category of content playback devices, such as IPTVs or audio receivers. In this way, a user may review frequently-accessed services and assets appropriate to a given type of content playback device. For example, if a user desires to listen to music, it would be superfluous for the frequently-accessed service or asset list to include video content, and thus the user could employ a list like 29c' to specifically search for frequently-played audio assets. In an alternative embodiment, where a user has chosen a content playback device for playback, the frequently-accessed service or asset list may be automatically filtered based on the type of the chosen content playback device.

Other variations will also be seen. For example, a frequently-accessed list may be based on a second display, where the services and assets frequently-accessed by each second display are respectively listed. In another variation, because the user account and user profile may allow a user to set up a friends list, a user may be enabled to view frequently-accessed service and asset lists of their friends. In another variation, a display may be provided to all or a subset of friends listing the most popular frequently-accessed service and asset list, where popularity is defined as the most views amongst a group of friends. In another implementation, a list of the most frequently-accessed services or assets may be displayed, weighted by the local or global popularity of the items. In any case, such lists allow users to discover services and assets they may otherwise have missed.

In another variation, any of the frequently-accessed service and asset lists may be time-of-day or date dependent. In this way, the services and assets presented on the frequently-accessed service or asset list in the, e.g., morning, local time, may be different from those presented in the evening. Such a feature may be particularly convenient when a user has a set of services or assets they frequently access in the morning, but not in the evening. For example, a user may access services having national or local news in the morning, while more typically accessing movie or music services in the evening.

It will be noted that numerous other variations of the above may be understood, the same being within the scope of the current principles.

Figure 6:
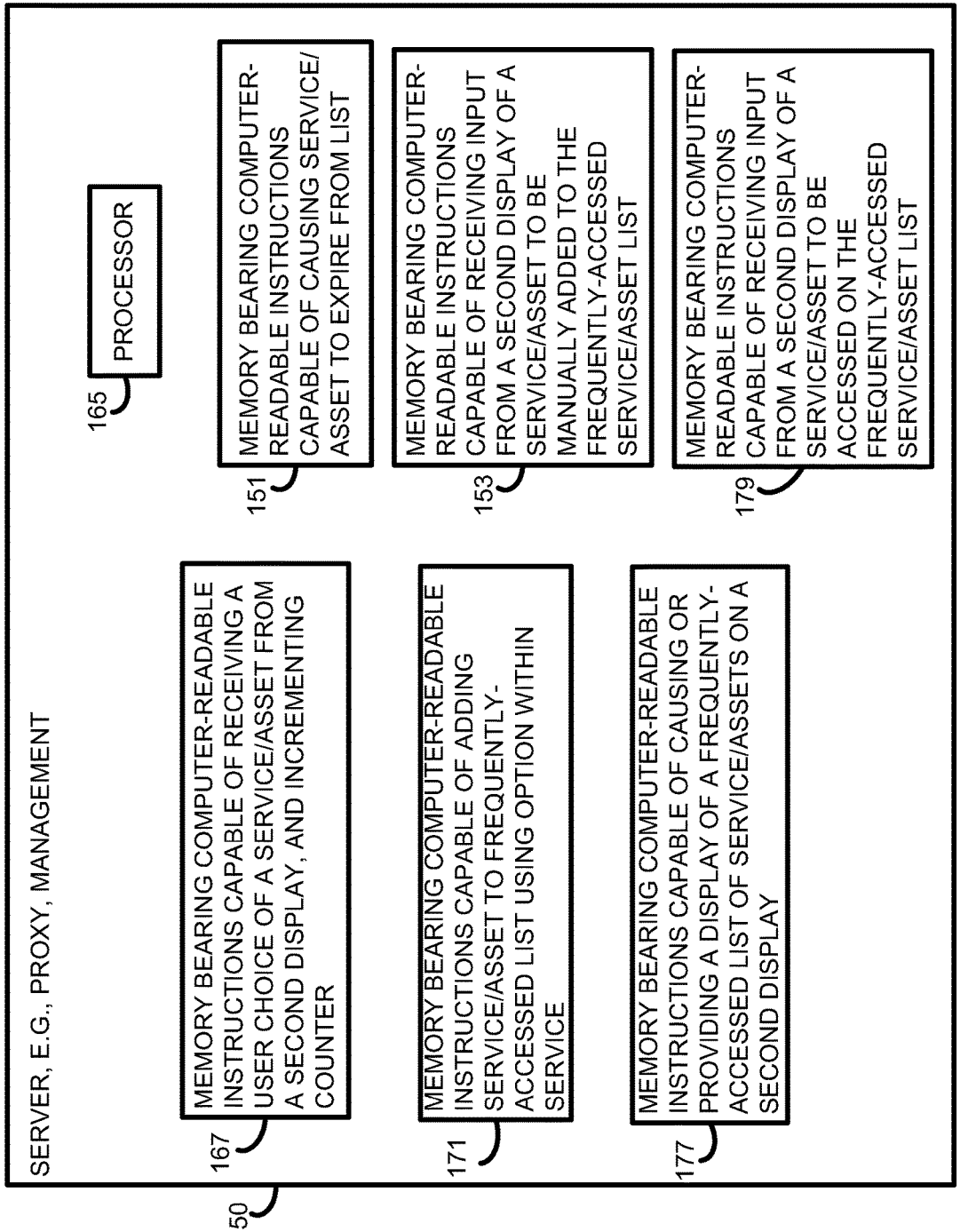
FIG. 6 is a block diagram of an exemplary server in accordance with another aspect of the present principles.

Referring to FIG. 6, an implementation of a server 50 is illustrated. In this implementation, the server includes various memory locations bearing computer-readable instructions capable of performing various steps. The server may be, e.g., a proxy server, a management server, or the like. The server 50 includes a processor 165 and memory 167 bearing computer-readable instructions capable of receiving a user choice of a service or asset from a second display, and upon access of the service or asset, incrementing a counter associated with the service or asset. In this way, frequency of access may be tracked. The server 50 may further include memory 171 bearing computer-readable instructions capable of adding a service or asset to the frequently-accessed list using an option within the service. This memory may receive a signal from a content server about a selected service or asset to cause memory 171 to add the service. The server 50 may further include memory 153 bearing computer-readable instructions capable of receiving input from a second display of a service or asset to be manually added to the frequently-accessed service or asset list. This memory receives input as a result of a user employing an option within the second display application (which may include a level of processing on the server) to manually select and add a service or asset for inclusion in the frequently-accessed service or asset list. Generally the server 50 will include all three of memories 153, 167 and 171, although in any given implementation only one is required.

The server 50 further includes memory 177 bearing computer-readable instructions capable of causing or providing a display of a frequently-accessed list of services or assets or both on a second display. This memory takes the information from memories 153, 167 or 171, or a combination of all three, and compiles the same in the frequently-accessed service or asset list. The memory 177 generally requires at least making a frequently-accessed service or asset list available for access by a second display, or making the data necessary to compile the list available to the second display. In the latter case, the second display generates the list based on the data. The data may be as minimal as just a service identification, in which case the second display retrieves any needed additional information from its own list of services or assets, either as stored or as available from other sources.

Next, the server 50 includes memory 151 bearing computer-readable instructions capable of causing a service or asset to expire from the list. In this memory, an expiration window or other duration of time may be provided such that if a service or asset is not accessed for given period of time, the same is removed from the frequently-accessed list.

Finally, the server 50 includes memory 179 bearing computer-readable instructions capable of receiving a selection from a second display of a service or asset on the frequently-accessed service or asset list, e.g., the input indicating that the service or asset is to be accessed.

Figure 7:
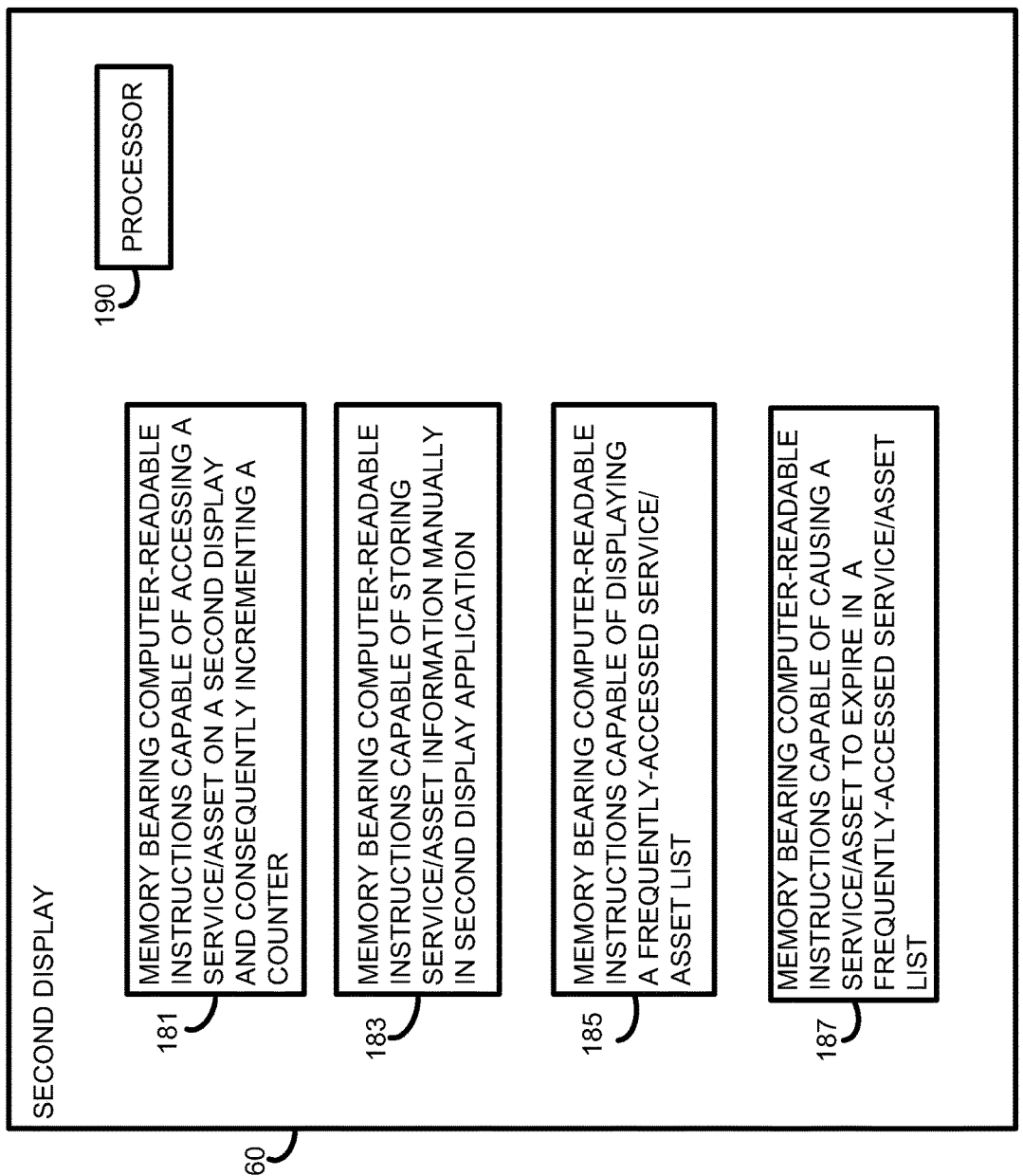
FIG. 7 is a block diagram of an exemplary second display in accordance with another aspect of the present principles.

Referring to FIG. 7, an implementation of a second display 60 is illustrated. In this implementation, as in FIG.

6, the second display includes various memory locations bearing computer-readable instructions capable of performing various steps. The second display may be, e.g., any of the types of computing devices as described above. The second display 60 includes a processor 190 and memory 181 bearing computer-readable instructions capable of accessing a service or asset on a second display. The services and assets are generally from a service provider, and may be grouped as a group of services accessible through a management server infrastructure. The second display 60 may further include memory 183 bearing computer-readable instructions capable of storing service or asset information manually in a second display application. For example, within the second display application, a feature may be provided whereby a user can manually add a service to a frequently-accessed service list. This list may be stored either on the second display or on a server forming part of the management infrastructure. If stored locally, the system and method may be entirely run from the second display; however, such a system would lack information about services or assets accessed from other second displays associated with the user account (unless such accesses are communicated amongst second displays, e.g., on a periodic basis, or stored in a network-accessible location). Generally the second display 60 will include both memories 181 and 183, although in a given implementation only one is required.

The second display 60 further includes memory 185 bearing readable instructions capable of displaying a frequently-accessed list of services or assets or both. Finally, the second display 60 may include memory 187 bearing computer-readable instructions capable of causing a service or asset to expire in a frequently-accessed service or asset list. In other words, and particularly where the frequently-accessed service or asset list is stored on the second display, the memory 187 may be employed to cause a service or asset to be removed if the same is not accessed after an extended period of time. Other memories may also be included, such as those that allow for a prompting of the user to automatically return to the most frequently-accessed service or asset, or the like.

Other memories will also be understood, although these are not shown in FIGS. 6 and 7. For example, memories may be provided which bear computer-readable instructions capable of storing information about a last location within the service or asset where access was made, e.g., at a category location or the like, and upon request for a subsequent access of the service or asset by the user, either initiating access at the location or requesting if the user wishes to start access (in the case of the service) at a homepage of the service.

In an alternative implementation, these memories may be implemented as modules, either in software, hardware, or various forms of firmware. For example, a session module may be employed to establish user account sessions between the server and the second display. A database module may be employed to store the frequently-accessed service list. Communications modules may be employed to provide data-transfer corresponding to services. Other modules will also be understood.

Systems and methods have been disclosed that allow improvement of the user experience of the IPTV without adding to the hardware costs of the unit. As disclosed above, users may employ the system and method to display a frequently-accessed service or asset without having to search for the same within a lengthy list of services or assets.

Figure 8:
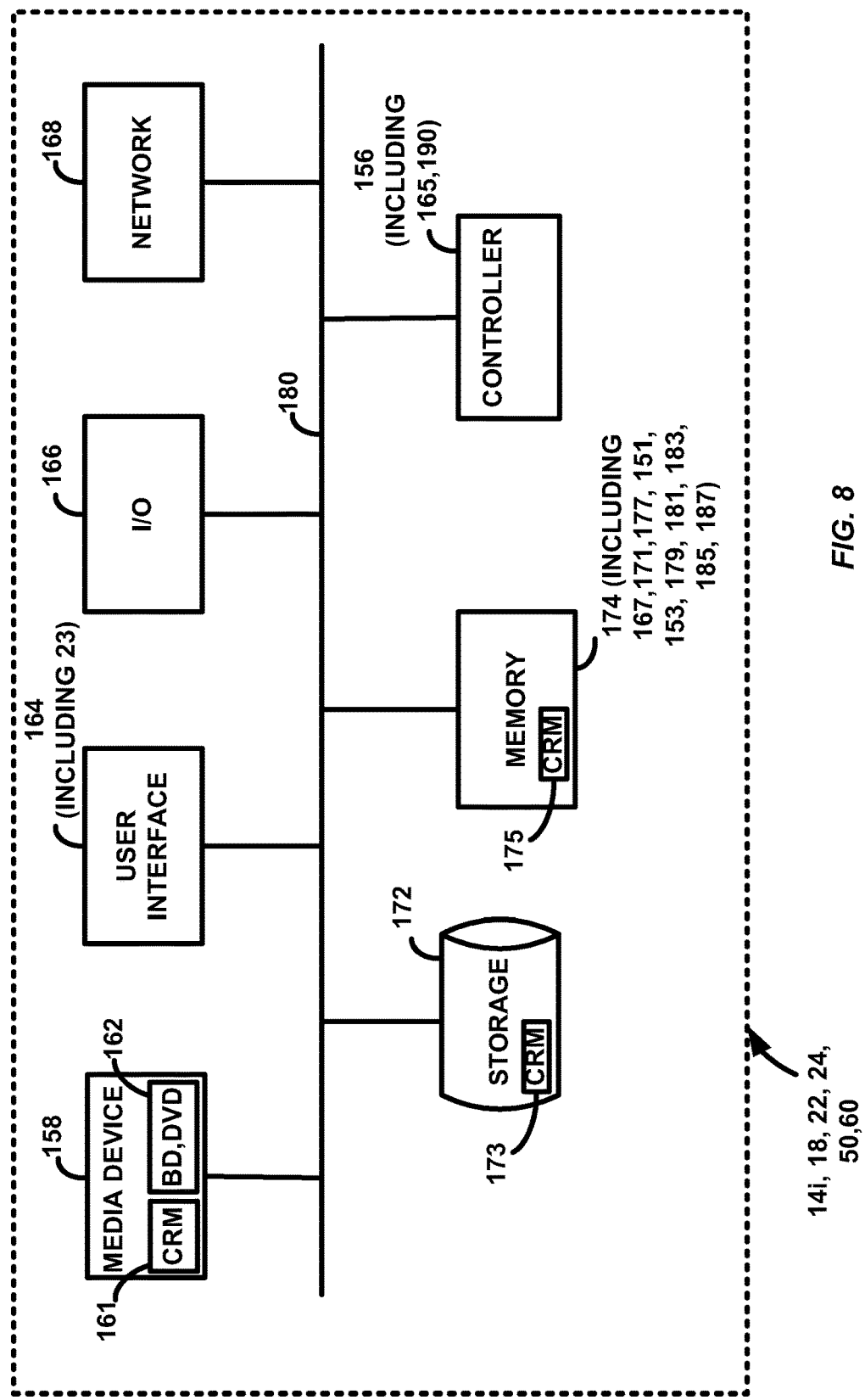
FIG. 8 illustrates an exemplary computing environment, e.g., that of the disclosed second display, proxy server, management server, or content server.

One implementation includes one or more programmable processors and corresponding computing system components to store and execute computer instructions, such as to execute the code that provides the second display 14 or various server functionality, e.g., that of the proxy server 22, management server 18, and content server 24. Referring to FIG. 8, a representation of an exemplary computing environment for a second display or for any of the servers is illustrated.

The computing environment includes a controller 156, a memory 174, storage 172, a media device 158, a user interface 164, an input/output (I/O) interface 166, and a network interface 168. The components are interconnected by a common bus 180. Alternatively, different connection configurations can be used, such as a star pattern with the controller at the center.

The controller 156 includes a programmable processor and controls the operation of the second display and servers and their components. The controller 156 loads instructions from the memory 174 or an embedded controller memory (not shown) and executes these instructions to control the system. In its execution, the controller 156 may provide the second display control of a content playback device system as, in part, a software system. Alternatively, this service can be implemented as separate modular components in the controller 156 or the second display.

Memory 174, which may include non-transitory computer-readable memory 175, stores data temporarily for use by the other components of the second display and servers, and the same may include memories 167, 171, 177, 179, 181, 183, 185, 187, and 189 as discussed above. In one implementation, memory 174 is implemented as RAM. In other implementations, memory 174 also includes long-term or permanent memory, such as flash memory and/or ROM.

Storage 172, which may include non-transitory computer-readable memory 173, stores data temporarily or long-term for use by other components of the second display and servers, such as for storing data used by the system. In one implementation, storage 172 is a hard disc drive or a solid state drive.

The media device 158, which may include non-transitory computer-readable memory 161, receives removable media and reads and/or writes data to the removable media. In one implementation, the media device 158 is an optical disc drive or disc burner, e.g., a writable Blu-ray® disc drive 162.

The user interface 164 includes components for accepting user input from the user of, e.g., the second display, and presenting information to the user. In one implementation, the user interface 164 includes a keyboard, a mouse, audio speakers, and a display. The controller 156 uses input from the user to adjust the operation of the, e.g., second display 14*i*.

The I/O interface 166 includes one or more I/O ports to connect to corresponding I/O devices, such as external storage or supplemental devices, e.g., a printer or a PDA. In one implementation, the ports of the I/O interface 166 include ports such as: USB ports, PCMCIA ports, serial ports, and/or parallel ports. In another implementation, the I/O interface 166 includes a wireless interface for wireless communication with external devices. These I/O interfaces may be employed to connect to one or more content playback devices.

The network interface 168 allows connections with the local network and optionally with content playback device 12 and includes a wired and/or wireless network connection, such as an RJ-45 or Ethernet connection or "WiFi" interface (802.11). Numerous other types of network connections will be understood to be possible, including WiMax, 3G or 4G, 802.15 protocols, 802.16 protocols, satellite, Bluetooth®, infrared, or the like.

The second display and servers may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and within the scope of the present invention. For example, the ordering of frequently-accessed services may be performed by the second display, rather than a server. Moreover, while media content services have been focused on, the user may also browse, and store in a frequently-accessed service list, services for other types of business or consumer transactions, such as video rentals, home shopping sites, or the like on the second display. Portions of the frequently-accessed list of services may be stored on a second display or content playback device, while other portions are stored on a server.

As noted above, the frequently accessed list of services may include assets, either along with the services or in a separate list. In such a list of assets or content items, the user may specify the number of assets to display at one time, and a default number may be provided where the user has not so specified.

While the system and method have described implementations in which content playback devices have been selected by a user before browsing, numerous other variations are possible. For example, a cache or cookie or other information may be employed to store information about content playback devices, so that no user choice is necessary. In another example, samples of assets, e.g., movie trailers, may be obtained from content service providers, and these samples may be browsed freely without a user selection of a content playback device for playback even including playback on the second display if supported. In another variation, a profile system may be employed that communicates content playback device information upon start-up according to a profile; e.g., a given content playback device may always be associated with and may authenticate itself with a given service provider. In this sense, a content playback device is still being chosen, but the choice does not require an affirmative step by the user. Use of any of these alternatives, or others, ensures that the content consumption of each content playback device is tracked. It further allows, as described, the proxy server to filter out content that the content playback device is incapable of playing. Even where browsing requires no device choice at all, e.g., browsing shopping sites, some level of customization may occur, e.g., by consideration of the origination location of the visiting second display's IP address.

In addition, the above description was primarily directed to implementations in which the local IP address of the second display was retrieved and stored on the server. However, other ways of discovering the second display are also possible. For example, device discovery is also possible using a broadcast method within the local network. Compatible devices that recognize the broadcast message will respond with their necessary credentials and information to indicate their compliance with the application for the second display. In many cases, broadcasting methods are primarily directed to native applications, not web applications; however, a broadcasting library may be employed to allow the implementation even within a web application.

While the above description has focused on implementations where a second display is coupled to a content playback device through a local network or over the internet, it will be understood that the same will apply to any method by which the two may communicate, including 3G, 4G, and other such schemes.

Accordingly, the present invention is not limited to only those implementations described above.

The invention claimed is:

1. A method of creating a list of frequently-accessed services or assets or both, comprising:
   i. in a management server infrastructure where a selected display associated with a user account communicates with the management server infrastructure to allow access to a plurality of services and assets for playback of assets by a content playback device distinct from the selected display, the selected display using an authentication credential of the content playback device to authenticate the selected display with the management server infrastructure and such that the selected display appears to the management server infrastructure as an authenticated content playback device, at least a portion of the services and assets having counters associated therewith for enumerating a number of accesses, upon access of a service or asset on the selected display, causing a counter associated with the service or asset, respectively, to be incremented; and
   ii. displaying a list of frequently-accessed services or assets or both on the selected display, the list including services or assets or both having a highest number of accesses according to the respective counters.

2. The method of claim 1, wherein the counters are maintained on the selected display.

3. The method of claim 1, wherein the counters are maintained on a server.

4. The method of claim 1, wherein the displaying is caused by a user request on the selected display.

5. The method of claim 1, wherein the list of frequently-accessed services or assets on the selected display further includes services or assets, respectively, that have been manually entered.

6. The method of claim 1, wherein the list of frequently-accessed services or assets on the selected display further includes services or assets, respectively, that have been entered by action of a service, wherein a user has directed from within a service that the service or asset, respectively, be included in the list of frequently-accessed services or assets.

7. The method of claim 1, further comprising removing a service or asset from the list of frequently-accessed services or assets, respectively, if the respective service or asset has not been accessed for a time period greater than the duration of an expiration window.

8. The method of claim 1, further comprising stopping operation of the expiration window or the counters upon direction by a user.

9. The method of claim 1, further comprising storing data about a selected display, content playback device, user account, or user profile associated with the service or asset access, and wherein the frequently-accessed service or asset list is specific to the selected display, content playback device, user account, or user profile, respectively.

10. The method of claim 1, further comprising filtering the list of frequently-accessed services or assets based on a regional ruleset corresponding to a region in which the content playback device resides.

11. The method of claim 1, wherein the selected display is a tablet computer, a smart phone, a laptop computer, an internet appliance, or a computing device with internet access.

12. The method of claim 1, further comprising ordering the list on the selected display according to the number of accesses according to the respective counters.

13. A non-transitory computer-readable medium, comprising instructions for causing a computing device to implement the method of claim 1.

14. The method of claim 9, wherein the list of frequently-accessed services or assets is specific to a time-of-day recorded by the selected display, content playback device, user account, or user profile.

15. A method of enabling a user to access a frequently-accessed service or asset on a selected display, comprising:
   i. in a management server infrastructure where a selected display associated with a user account communicates with the management server infrastructure to allow access to a plurality of services or assets for playback of assets by a content playback device distinct from the selected display, the selected display using an authentication credential of the content playback device to authenticate the selected display with the management server infrastructure and such that the selected display appears to the management server infrastructure as an authenticated content playback device, at least a portion of the services or assets, respectively, having a counter associated therewith for enumerating a number of accesses, upon access of a service or asset on the selected display, receiving a signal about the accessed service or asset, respectively, at a management server; and
   ii. causing the display on the selected display of a list of the most frequently-accessed services or assets or both, the list including services or assets or both, respectively, associated with the user account having a highest number of accesses according to the respective counters.

16. The method of claim 15, wherein the list of frequently-accessed services or assets caused to be displayed on the selected display includes services or assets that have been manually entered.

17. The method of claim 15, wherein the list of frequently-accessed services or assets caused to be displayed on the selected display includes services or assets that have been entered by action of a service, wherein a user has directed from within a service that the service or asset be included in the list of frequently-accessed services or assets.

18. The method of claim 15, further comprising storing data about a selected display, content playback device, user account, or user profile associated with the service or asset access, and wherein the frequently-accessed service or asset list is specific to the selected display, content playback device, user account, or user profile, respectively.

19. The method of claim 15, further comprising filtering the frequently-accessed service or asset list based on a regional ruleset corresponding to a region in which a content playback device associated with the user account resides.

20. A non-transitory computer-readable medium, comprising instructions for causing a computing device to implement the method of claim 15.

* * * * *